(12) United States Patent
Seidel et al.

(10) Patent No.: US 8,072,981 B2
(45) Date of Patent: *Dec. 6, 2011

(54) HIGH RATE PACKET DATA TRANSMISSION SYSTEM

(75) Inventors: Eiko Seidel, Langen (DE); Thomas Wiebke, Langen (DE)

(73) Assignee: Panasonic Corporation, Osaka (JP)

( * ) Notice: Subject to any disclaimer, the term of this patent is extended or adjusted under 35 U.S.C. 154(b) by 789 days.

This patent is subject to a terminal disclaimer.

(21) Appl. No.: 11/979,020

(22) Filed: Oct. 30, 2007

(65) Prior Publication Data

US 2008/0069055 A1  Mar. 20, 2008

Related U.S. Application Data

(60) Continuation of application No. 11/391,205, filed on Mar. 29, 2006, now Pat. No. 7,310,340, which is a continuation of application No. 10/674,527, filed on Oct. 1, 2003, now Pat. No. 7,061,915, which is a division of application No. 09/858,590, filed on May 17, 2001, now Pat. No. 6,658,005.

(30) Foreign Application Priority Data

May 17, 2000 (EP) ..................................... 00110551

(51) Int. Cl.
*H04L 1/18* (2006.01)

(52) U.S. Cl. .......................... 370/394; 370/524; 714/748

(58) Field of Classification Search .......................... None
See application file for complete search history.

(56) References Cited

U.S. PATENT DOCUMENTS

| 4,862,461 | A | * | 8/1989 | Blaner ........................... 714/749 |
| 4,999,834 | A | | 3/1991 | Leo et al. |
| 5,603,081 | A | | 2/1997 | Raith et al. |
| 5,784,362 | A | | 7/1998 | Turina |
| 5,884,171 | A | | 3/1999 | Tanabe et al. |
| 5,970,067 | A | * | 10/1999 | Sathe et al. ................... 370/394 |
| 6,021,124 | A | | 2/2000 | Haartsen |
| 6,317,430 | B1 | | 11/2001 | Knisely et al. |
| 6,359,877 | B1 | | 3/2002 | Rathonyi et al. |
| 6,367,045 | B1 | | 4/2002 | Khan et al. |

(Continued)

FOREIGN PATENT DOCUMENTS

EP 0981221 A2 2/2000

(Continued)

OTHER PUBLICATIONS

Submission to the EPO dated Oct. 2, 2009 (pp. 1-6) in response to the Communication from the EPO dated Aug. 4, 2009 forwarding the opponent's submission of Jul. 20, 2009 in connection with the Opposition against European Patent No. 1 679 817, which is a counterpart European Patent to the present U.S. application.

(Continued)

*Primary Examiner* — Min Jung

(74) *Attorney, Agent, or Firm* — Wenderoth, Lind & Ponack L.L.P.

(57) ABSTRACT

A hybrid ARQ method for packet data transmission in a mobile communication system wherein previously transmitted packets are combined with retransmitted packets. The packets are segmented into a plurality of protocol data units (PDUs), and each PDU is assigned a sequence number for identification purposes. The sequence number is transmitted on a control channel which is separate from the data channel for transmitting the PDUs.

17 Claims, 4 Drawing Sheets

U.S. PATENT DOCUMENTS

| | | | |
|---|---|---|---|
| 6,498,936 B1 | 12/2002 | Raith | |
| 6,532,211 B1 | 3/2003 | Rathonyi et al. | |
| 6,614,810 B1 * | 9/2003 | Lee et al. | 370/471 |
| 6,647,002 B1 | 11/2003 | Suda et al. | |
| 6,704,898 B1 | 3/2004 | Furuskar et al. | |
| 6,801,512 B1 | 10/2004 | Cudak et al. | |
| 6,816,478 B1 | 11/2004 | Laroia et al. | |
| 7,065,068 B2 | 6/2006 | Ghosh et al. | |
| 7,310,340 B2 * | 12/2007 | Seidel et al. | 370/394 |

FOREIGN PATENT DOCUMENTS

| | | |
|---|---|---|
| EP | 0996248 A1 | 4/2000 |
| JP | 2000-196673 | 7/2000 |
| WO | 00/02326 | 1/2000 |
| WO | 00/08796 | 2/2000 |

OTHER PUBLICATIONS

Notice of Opposition to a European Patent issued Nov. 28, 2008 in European Patent No. 1 679 817.

"Feasibility study of Advanced techniques for High Speed Downlink Packet Access", TSGR1#12, R1-556, a document by Motorola for 3GPP TSG RAN Working Group 1 meeting #12 in Seoul, Korea, Apr. 10-13, 2000, published before the meeting and discussed during the meeting, publication at the latest on Apr. 13, 2000.

"Signaling methods for Hybrid ARQ Type II" Tdoc R2-000833, a paper for discussion by Siemens for 3GPP TSG RAN WG2 #12 meeting in Seoul, Korea, on Apr. 10-14, 2000, published before the meeting and discussed during the meeting, publication at the latest Apr. 13, 2000.

Revised Minutes for 3GPP TSG-RAN WG1 12$^{th}$ Meeting, TSGR1-00-0635, in particular pp. 19, 20 and 27-31 (Annex B, list of participants).

Approved report of the 12$^{th}$ TSG-RAN meeting (Seoul, Korea, Apr. 10-13, 2000), R2-000955, in particular p. 46 (Annex B, list of documents) and pp. 38-41 (Annex A, list of delegates).

The New Shorter Oxford English Dictionary, vol. 1 A-M, pp. 1348-1349.

The New IEEE Standard Dictionary of Electrical and Electronics Terms (Including Abstract of All Current IEEE Standards), Fifth Edition, pp. 829-830.

3G TS 25.301 V3.4.0 (Mar. 2000), Technical Specification, 3$^{rd}$ Generation Partnership Project; Technical Specification Group Radio Access Network; Radio Interface Protocol Architecture, (Release 1999), published Mar. 2000.

Letter from the opponent dated Jul. 20, 2009 in connection with the Opposition for European Patent 1679817, which is a counterpart European Patent to the present U.S. application.

Declaration by Mr. J. Pirskanen dated Jul. 13, 2009.

Index of /ftp/tsg_ran/WG2_RL2/TSGR2_12/Docs/Zips, dated Jun. 24, 2009.

"Supplemental Specification for Support of Very High Rate Traffic in 3G Spread Spectrum Systems", (Strawman), 3$^{rd}$ Generation Partnership Project 2 "3GPP2", pp. 1-39.

3GPP2 TSG-C 1XTREME Ad Hoc Group Meeting Summary Report from Mar. 2000 meeting in Cheju, Korea, dated Apr. 19, 2000.

Miller et al. "Automatic Repeat Request Error Control Schemes" IEEE Communications Magazine, vol. 22, No. 12, Dec. 1987, pp. 5-5-17-17.

"Support of Hybrid Arq Type II/III in the Physical Layer," TSGR1#4(99)355, TSG-RAN Working Group 1 meeting #4, Siemens AG, Shin-Yokohama, Japan (18) Apr. 19-20, 1999, p. 1-4.

Interlocutory decision in Opposition proceedings dated May 5, 2010 in connection with the Opposition against European Patent No. 1 679 817, which is a counterpart European Patent to the present U.S. application.

Grounds of Appeal issued Sep. 9, 2010 in counterpart European Application No. 06007523.1.

"Support of Hybrid ARQ Type II/III in the Physical Layer", TSGR1#4(99)355, TSG-RAN Working Group 1 meeting #4, Document D14, pp. 1-4.

Index of /ftp/tsg_ran/WG1_RL1/TSGR1_04/Docs/Pdfs, Document D15, Aug. 26, 2010, pp. 1-3.

* cited by examiner

HIGH RATE PACKET DATA TRANSMISSION SYSTEM

This application is a continuation of application Ser. No. 11/391,205, filed Mar. 29, 2006 now U.S. Pat. No. 7,310,340, which is a continuation of application Ser. No. 10/674,527, filed Oct. 1, 2003, now U.S. Pat. No. 7,061,915, which is a divisional of application Ser. No. 09/858,590, filed May 17, 2001, now U.S. Pat. No. 6,658,005.

FIELD OF THE INVENTION

The present invention relates to retransmission techniques in mobile communication systems, and, in particular, CDMA systems. More specifically, the present invention relates to a hybrid ARQ (automatic retransmission request) method for packet data transmission that combines previously transmitted packets with retransmitted packets. With each combining operation, redundancy is increased and the packet is more likely to be received correctly even in hostile communication environments. In more detail, the present invention relates to a hybrid ARQ method which is commonly referred to in the art as hybrid ARQ type II, III, or incremental redundancy.

BACKGROUND OF THE INVENTION

A common technique for error detection of non-real time services is based on Automatic Repeat request (ARQ) schemes which are combined with Forward Error Correction (FEC), called hybrid ARQ. If an error is detected by Cyclic Redundancy Check (CRC), the receiver requests the transmitter to send additional bits of data.

From different existing schemes, the selective-repeat continuous ARQ is most often used in mobile communications. This scheme in connection with FEC will be used for next generation mobile communication systems such as UMTS (Universal Mobile Telecommunications System). A retransmission unit of the RLC (Radio Link Control) layer is referred to as PDU (Protocol Data Unit).

In the art, three different types of ARQ are commonly defined as specified below. Examples of corresponding prior art documents are:
Performance of punctured channel codes with ARQ for multimedia transmission in Rayleigh fading channels; Lou, H. and Cheung, A. S.; 46th. IEEE Vehicle Technology Conference, 1996;
Analysis of a type II hybrid ARQ scheme with code combining, S. Kallel, IEEE Transactions on Communications, Vol. 38#8, August 1990; and
Throughput performance of Memory ARQ schemes, S. Kallel, R. Link, S. Bakhtiyari, IEEE Transactions on Vehicular Technology, Vol. 48#3, May 1999.

Type I: The erroneous PDUs are discarded and a new copy of that PDU is retransmitted and decoded separately. There is no combining of earlier and later versions of that PDU.

Type II: The erroneous PDU that needs to be retransmitted is not discarded, but is combined with some incremental redundancy bits provided by the transmitter for subsequent decoding. Retransmitted PDUs sometimes have higher coding rates and are combined at the receiver with the stored values. That means that only little redundancy is added in each retransmission.

Type III: Is the same as Type II with the only difference being that every retransmitted PDU is now self-decodable. This implies that the PDU is decodable without the need of forming a combination with previous PDUs. This is useful if some PDUs are so heavily damaged that almost no information is reusable.

Schemes of type II and III are obviously more intelligent and show some performance gain because they have the ability to adjust the coding rate to changing radio environments and to reuse the redundancy of previously transmitted PDUs.

To support incremental redundancy, the sequence number (SN) of the transmission unit has to be encoded separately. The stored data with the known SN can then be combined with subsequent retransmissions.

In the prior art, the SN is encoded in the PDU header or in the time slot header (e.g. EP-A-0938207) and transmitted together with the PDU. If the PDU is corrupted, it is likely that the header is also destroyed. Therefore, the coding has to be done with a lower coding rate to allow the SN to be read even when the data is erroneous. As a result, a large coding overhead exists to ensure reliable transmission of the sequence number. The coding for the SN therefore has to be different from that used for the PDUs resulting into increased complexity. To ensure that the SN is correct, a CRC parity check could be applied, but reliable CRC over a few bits is not very efficient.

Besides the signalling overhead that is introduced by the prior art methods, it is the implementation complexity that has prevented this technique from being used. A large amount of memory is required in the receiver to store the erroneous packets for combining with the retransmissions. Since the SNs are not known before receiving the retransmission, it is not possible to start the combining process before the SNs have been decoded.

SUMMARY OF THE INVENTION

The object underlying the present invention is to provide a hybrid ARQ method with less signalling overhead and low implementation complexity. The present invention overcomes the prior art problems since the sequence number is transmitted over a separate control channel. This allows for a reduction of the complexity of the receiver since the sequence number may be transmitted beforehand which allows a more efficient decoding and combining of the PDUs which may follow at a later time. Instead of storing the complete frame, decoding the SNs, combining stored packets with now identified retransmitted packets and finally decoding the packets, only the combining and decoding need to be done. Furthermore, delivery of the SNs on a separate channel makes the introduction of this method into existing systems easy since the PDU format and the complete mapping function in the medium access control MAC layer can be left unchanged compared to a retransmission scheme not using type II/III combining.

According to preferred embodiments, different channelization codes, different time slots and different frequencies are used for the control channel for transmitting the sequence numbers and the data channel for transmitting the PDUs. This provides for gaining performance due to time and frequency diversity and separate physical channels of the PDU and the SN.

Preferably, the data channel for transmitting the PDUs is a channel shared by several users which allows more efficient use of the channel resources.

According to a preferred embodiment, the control channel for transmitting the SNs is a low rate dedicated channel or a shared control channel in order to save channel resources.

According to a further advantageous embodiment, the quality of service QoS of the control channel is independent from the QoS of the data channel for transmitting the PDUs by suitably controlling at least one of the parameters comprising transmission power, coding rate and spreading factor. Consequently, transmission efficiency as well as reliable transmission of the sequence number is attained by separately controlling the QoS for the SN and the PDU.

For higher data rates, it is advantageous to combine multiple sequence numbers in a sequence number data unit SNDU in order to compress the signalling and to increase CRC efficiency. Preferably, the SNDU is multiplexed with other signalling data or user data to save channel resources. According to a further preferred embodiment, the SNDU is sent together with an allocation message on the control channel for a shared uplink or downlink channel transmitting with a high data rate.

Depending on the used physical channel and the access technology, the reception of SNs and the PDUs are either not at all correlated with respect to time or the correlation with respect to time is less. Although it is advantageous that the SNs of the SNDU arrive in the order of the received PDUs, the high rate packet transmissions are less time constrained and allow for a time offset between the SN and the corresponding PDU.

According to a further preferred embodiment, the SNDU is mapped to more than one frame of the control channel which allows interleaving.

Further, it is preferred that correct reception of the SNDU is indicated from the mobile station to the base station or vice versa as part of a transmission protocol.

If the sequence number is additionally included in the header of each PDU, type III ARQ can be realized.

According to a further advantageous embodiment of the invention, the method includes that a network control unit transmits a signal indicative of whether the hybrid ARQ method is to be employed or not. Alternatively, the signal can be transmitted from the mobile or base station. As a variant, the base station and/or the mobile station can recognize from the existence of a SNDU whether the hybrid ARQ method is to be employed or not.

BRIEF DESCRIPTION OF THE DRAWINGS

The present invention will now be described in more detail with reference to the accompanying figures, in which.

DETAILED DESCRIPTION OF THE PREFERRED EMBODIMENTS

Next generation mobile communication systems such as UMTS will provide the capabilities to transmit variable bit rate packet transmission. Traffic characteristics can be very bursty and need a fast channel allocation strategy. One example for a fast allocation scheme is the use of a shared channel, where a high rate packet channel is only allocated to users actually having data to transmit. Thus, idle times of high rate dedicated channels are minimized. In WO-A-00/02326, an example for a shared channel concept is given. The invention can advantageously be used with a high rate shared channel.

The build-up of a dedicated channel (DCH) as a permanent resource is not very efficient to support packet traffic since the establishment of a DCH will take considerable time. Also, for CDMA communication systems using orthogonal codes, the available code resource is limited. The use of a downlink shared channel (DSCH) with fast resource allocation is seen as important for packet data because the data stream could have high peak rates but low activity cycles.

In the following, the invention shall be described by way of an example only in connection with a downlink shared channel called DSCH. When a shared channel is used, the spreading codes for high rate code users are allocated frame by frame. There will be a signalling channel for allocation messages in parallel to the DSCH. This could be a shared control channel or a low rate associated channel. In the described example, a low rate dedicated channel DCH is allocated to each user to maintain CDMA power control and to inform the mobile station when there is data on the shared channel to decode. The DCH will be allocated a high spreading factor (SF) code (e.g. SF=256), but still represent a considerably large overhead.

Figure 1:
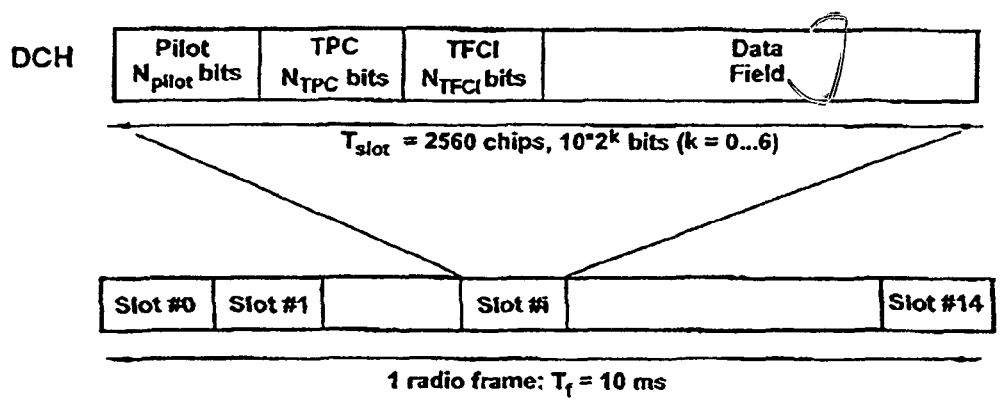
FIG. 1 shows a frame and slot structure of an DCH frame to which the present invention may be applied.

FIG. 1 shows the frame and slot structure of the low rate DCH that contains pilot bits for coherent detection, TPC (Transmit Power Control) bits for power control, TFCI (Transport Format Control Indicator) bits to indicate the transport format, and a data field. As indicated in FIG. 1, a time slot contains 2560 chips, and 15 slots #0 to #14 form a complete frame having a duration of 10 ms.

Figure 2:
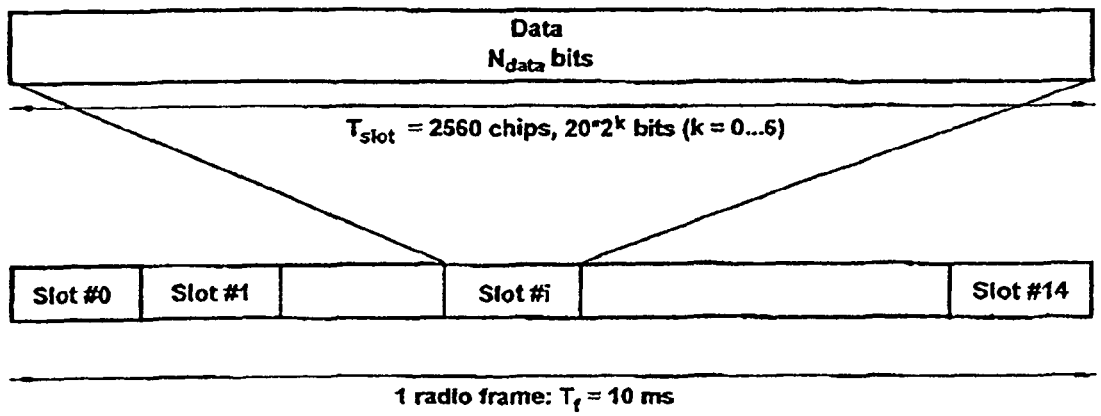
FIG. 2 shows a frame and slot structure of a DSCH frame to which the present invention may be applied.

FIG. 2 shows the frame and slot structure of the DSCH which only contains data. The DSCH can transmit variable data rates whereas different spreading factors (SF) are applied (k=0 ... 6 relates to SF=256 ... 4). The TFCI information transmitted on the DCH includes information about the spreading factor, the data rate and channelization code of the DSCH.

Figure 3:
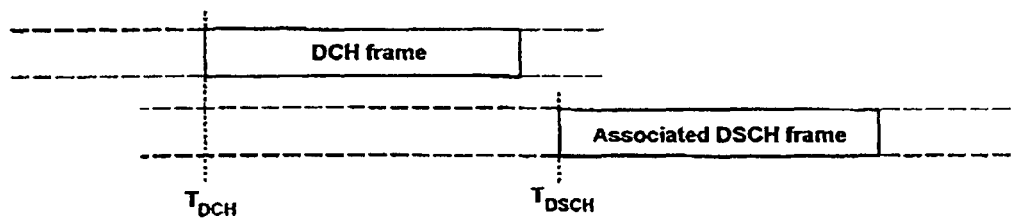
FIG. 3 shows the time relation between the DCH frame and the associated DSCH frame.

FIG. 3 shows the timing relation of the DSCH with one mobile station (with a low rate DCH) that might get data on the DSCH when there is data to transmit to the user. The timing of the DSCH is known since it is synchronous to other common channels. The high rate channel (DSCH) will only be allocated on demand and is shared by several users. Accordingly, the data on the DSCH only needs to be decoded if there is data indicated by the TFCI. The continuous DCH can, at the same time, be used to transport other data (e.g. circuit switched or other delay constrained data) or signalling data. DSCH and DCH operate in an asynchronous manner as different DCH have different timing to each other, but the relative timing is known to the mobile station and the data can be decoded correctly.

According to one aspect of the invention, the PDU sequence numbers will be sent on a separate physical channel. In the preferred embodiment, the SNs are sent together with the allocation message to minimize the signalling overhead needed for the packet transmission and the incremental redundancy scheme.

For CDMA communications systems, this implies that the channel where the signalling data is mapped onto is spread with a different channelization code before the signal is modulated. This allows the QoS by this channel to be controlled separately from the channel where the PDUs are sent. For instance, the power level of the DCH can be increased to improve the reception of the SNs. In future mobile communication systems such as UMTS, it is also possible to transmit certain fields with different power. For instance, the power of the DCH data field can be different from the TFCI, TPC or pilot power. The separation of control and user data provides additional flexibility. Some systems are therefore also using separate protocol stacks for control and user plane of the ISO (International Standardization Organization) OSI (Open System Interconnection) protocol stack. A benefit of separating control information from data is that the signalling can be combined with other signalling thus providing more efficient transmission. To send the SNs over a different physical channel can also mean to send them in a different slot (e.g. TDMA) or on a different frequency (e.g. FDMA, OFDM).

In prior art systems, the sequence numbers are sent together with the PDU for unambiguous assignment and minimal delay. Typically, a strong block code is used to encode single sequence numbers since only a couple of bits have to be encoded. New packet data applications allow for some delay that have not been acceptable for traditional circuit switched applications (e.g. speech). In the preferred embodiment of the present invention, the DCH frame that contains the allocation message (TFCI) for the shared channel also delivers the SNs for the PDUs to be transmitted in the corresponding DSCH frame. With the combination of these two methods, the signalling overhead of the shared channel concept and incremental redundancy is minimized by using the channel together. Also by this combination, the newly introduced delay is kept at a minimum because the allocation message is needed in any case if a high rate channel is shared by multiple users. Simulations have shown that the delay for packet data can even be reduced compared to a circuit switched connection since the 'big pipe' that is shared by multiple users is a more appropriate transmission scheme for applications where data does not arrive continuously. The time difference between the allocation message and the data packets has to be kept very small since, in a mobile communication environment, the conditions can change quite frequently.

Figure 4:
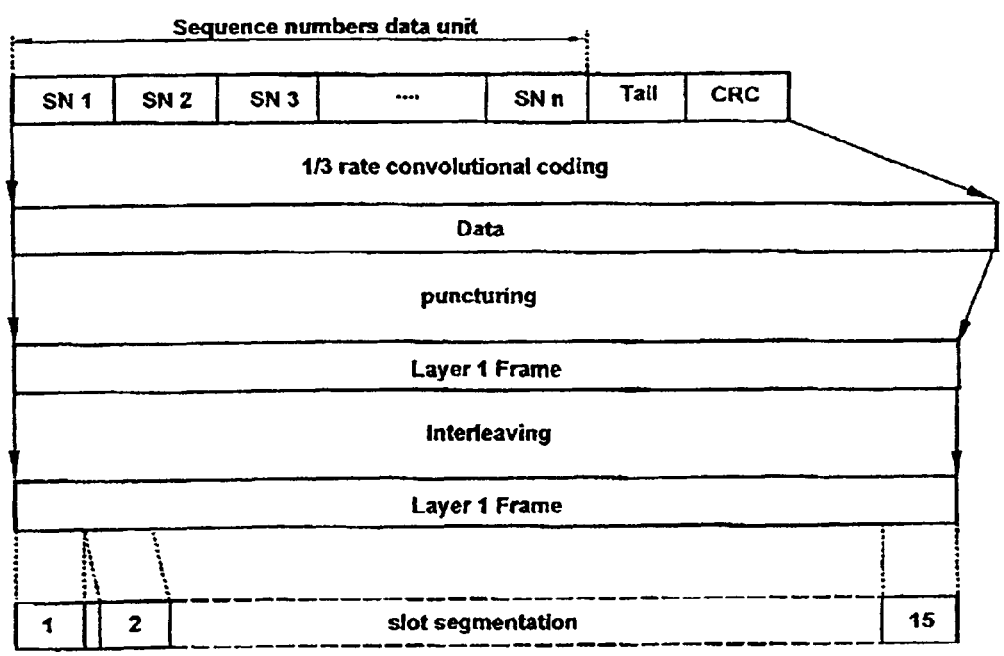
FIG. 4 shows the DCH frame data structure to be multiplexed on a 10 ms frame.

The sequence numbers will be delivered as a higher layer signalling message in the data field of the DCH. Since the shared channels are only used for higher data rates, it is possible to combine them for reliable encoding and to use more suitable codes such as convolutional or turbo codes. In the following the packet with the SNs shall be called Sequence numbers data unit—SNDU. FIG. 4 shows the most simple arrangement of SNs. Sequence numbers for all the packets in the next DSCH frame are arranged in order and encoded by a ⅓ rate convolutional encoder. Before encoding, 8 bits for code termination are attached as a tail to the SNs. Other coding methods such as Turbo or BCH encoding could also be used. To ensure reliable reception, the data field is protected by a CRC code that can have a variable size of 8, 12, 16 or 24 bits. The number of PDUs in the DSCH frame and consequently the number of SN in the DCH frame that are transmitted can vary from 1 up to more than 100 depending on the PDU size and the chosen data rate of the DSCH. After encoding, puncturing or repetition is applied to map the data onto the physical channel. Before slot segmentation, the data is interleaved over a frame (10 ms). Of course, it should be understood that this processing of coding and multiplexing is just given as a simplified example of an embodiment of the invention.

It is also possible that the SNDU is multiplexed together with other signalling data with user data on the DCH. A major advantage of the scheme proposed is that it is possible to group multiple SNs together. ARQ protocols typically use a sliding window technique. That means that except for the retransmissions, which are often sent with higher priority, all packets are sent in order. Different arrangements of the SNs can be used to compress the actual information in the SNDU that is sent over the air interface. For example, they do not have to be sent as a list in which each SN has around 6 to 12 bits. Instead, they could be sent in series, e.g. 1–4 or 1+3, 7–12 or 7+5 instead of 1, 2, 3, 4, 7, 8, 9, 10, 11, 12.

For a high rate shared channel that transmits several PDUs per frame, it will be difficult to put the SNDU into a single frame while maintaining the high spreading factor (e.g. 256, 512). A decrease of the spreading factor should be avoided to minimize the resources allocated in idle times. It should therefore be possible to map the SNDU onto more than one frame. The time offset between the DCH and the DSCH should take the maximum number of frames per SNDU into account. The interleaving size can also be increased to multiple frames or remains on a frame basis to make the SNs available as soon as possible. SNs could also be sent on multiple SNDUs to avoid large packet losses if a SNDU is corrupted.

An example shall be given in the following. The SNDU is mapped to two frames, whereas interleaving is only done over 10 ms. The DCH/DSCH offset is defined to a minimum of one frame. That means that the SNDU first frame is received before the corresponding DSCH frame, while the second SNDU frame is received simultaneously as the corresponding DSCH frame.

The retransmission window size and consequently the number of bits required for the sequence number should also be kept as small as possible to reduce the signalling overhead per PDU. A small window size requires that the round trip delay is as small as possible to speed up the retransmissions and acknowledge process.

The SNs in the DCH data field easily identify whether incremental redundancy is used or not before the PDUs are received. By this once again, receiver complexity is decreased since the reconfiguration of the receiver can be done before the reception of the PDUs. Incremental redundancy can easily be switched on/off by the proposed method, e.g. when the receiver runs out of memory.

The sequence numbers identify which PDUs shall be combined with each other. For a correct operation, it is therefore essential that the sequence numbers are correct.

The CRC will provide an effective means to ensure that the SNDU is received correctly. Nevertheless, means have to be provided in the protocol to resolve sequence number errors that are not detected. A high FEC encoding will ensure that the SNDU is received correctly even when some or all PDUs are erroneous. There is a trade-off in reliability and coding overhead. It might be more efficient to take regular failures into account instead of encoding data too reliably. A recognized problem is if the SNDU gets lost, all the PDUs of the corresponding frame are sent on the DSCH even though they can not be identified.

A variant of the invention is that the mobile station will send an indicator on the uplink DCH to the base station after the correct reception of a SNDU. Only when this indicator is received by the base station, the PDUs are sent on the DSCH. If the indicator is not received, the PDUs will not be sent and interference will be minimized.

For hybrid ARQ Type III, each PDU is self-decodable, meaning that they can theoretically be decoded without any combining with previous PDUs. Enough information is provided in each PDU to decode it without combining. For such schemes, a different approach has been found beneficial. The SNDU is also delivered on a separate channel but is not very strongly encoded. At the same time, the sequence number is additionally transmitted as part of the header in the PDU, as in the usual operation. The header is included in the RLC layer. If the SNDU is received correctly, the reception can be improved by PDU combining. If the SNDU is lost, the PDUs can still be decoded without combining (if reception quality allows) because the sequence number in the PDU header identifies the PDU for the RLC layer. By this, the coding overhead for SNDUs is decreased and the protocol can still work efficiently if the SNDU is lost. There are other advantages of this approach since it is possible to separate the RLC retransmission protocol completely from the re-combining process in the physical layer. If it is intended not to use SNDU transmission, the RLC layer protocol is exactly the same as without Hybrid ARQ Type III. This allows the combining operation to be switched off without any impact on RLC protocol, the PDU structure or the DSCH transmission in general. The drawback is that there is redundant information in the PDU header sent in cases where the SNDU is received correctly.

Figure 5:
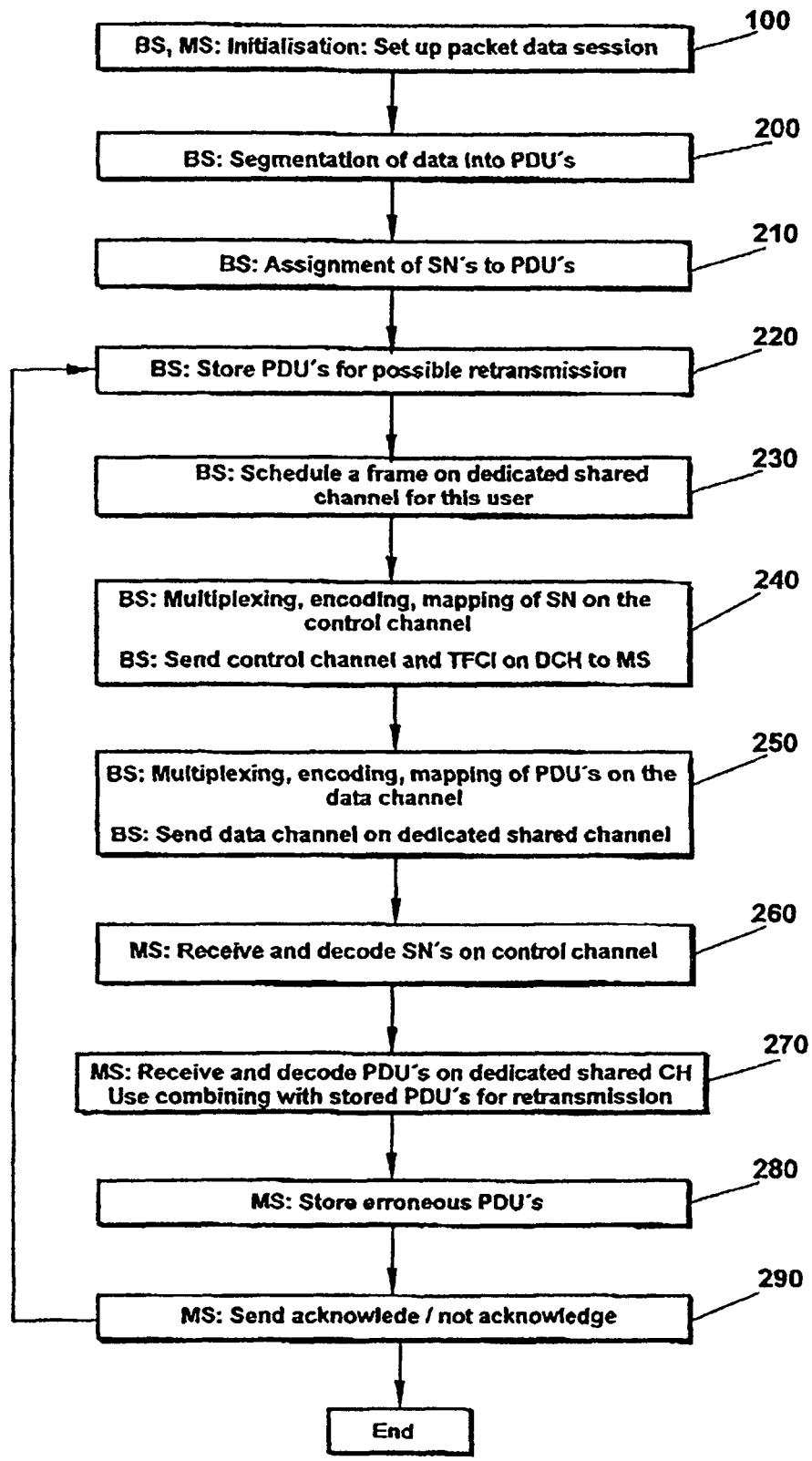
FIG. 5 shows a flow chart explaining the principles of the present invention.
Figure 6:
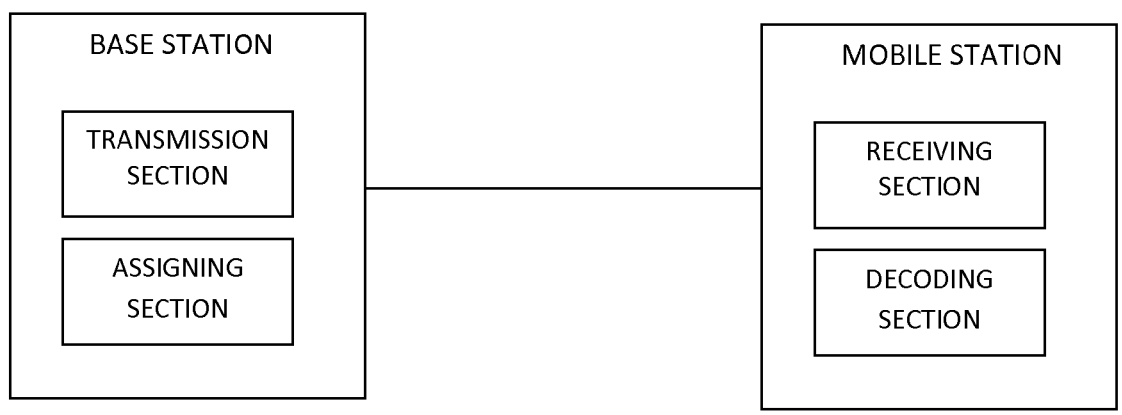
FIG. 6 shows a block diagram including a base station and a mobile station.

In the following, a preferred embodiment of the method of the invention is explained with reference to FIG. 5.

When a mobile station sets up a packet data session in step 100 (e.g. Internet access), the Base Station can decide, depending on the application, to use the DSCH for that user. A dedicated channel is established in up- and downlink. A transport format control indicator (TFCI) which defines the possible data rates on the DSCH is allocated by the base station and signalled to the mobile station.

If there are packets arriving at the base station, the data will be segmented in step 200 into PDUs. Now, the SNs are assigned to the PDUs (step 210) before they are stored according to step 220 for possible retransmission. Once enough PDUs are accumulated to be sent on the DSCH, the base station will schedule a frame on the DSCH for this user (step 230). The sequence numbers will be multiplexed, encoded according to FIG. 4 and mapped on the control channel as shown in step 240. Subsequently, the base station transmits the control channel including the TFCI on the DCH to the mobile station. In step 250, the PDUs are multiplexed, encoded and mapped on the data channel which is sent on the DSCH. With the specified timing (see FIG. 3), the mobile station receives the DCH and hence will be informed via TFCI (step 230) on the DCH (signal is spread with spreading code x) about the data to be decoded on the DSCH (signal is spread with spreading code y) and its transport format. In the same DCH frame (or the following frames if mapped to several frames), the sequence numbers will be signalled to, and decoded by, the mobile station (step 260). As a result, the mobile station knows exactly the beginning of the DSCH frame and will receive and decode the PDUs on the DSCH (step 270) sent in step 250.

The storage of erroneous PDUs (step 280) and the combining with retransmissions (step 270) will take place according to an implemented algorithm that is outside of the scope of this description. All correctly decoded packets are transmitted to the higher layers. Unsuccessfully decoded packets will be stored for recombining with retransmissions. Acknowledge (ACK) and Not-Acknowledge (NACK) messages (step 290) will be sent to the transmitter according to the implemented RLC protocol.

The mobile station will wait for new packets to be transmitted as long as the session is ongoing (return to step 220) and the user is likely to use the DSCH.

For future systems, it will be common that there are multiple logical channels mapped on the physical channel. A logical channel might consist of control data or user data and can belong to different applications or protocol entities. The multiplexing of the transport channel does not necessarily take place in the physical layer but is likely to be accomplished by the Medium Access Control (MAC) Layer. For incremental redundancy, this higher layer multiplexing is problematic because a transport block that is passed to the physical layer for transmission can consist of data from different logical channels. After decoding, one of the blocks might be correctly received while the other is erroneous. A retransmission has to be done based on the originally sent data. The exact data block including the correctly received data part would have to be retransmitted to make the recombining process work. Some of the logical channels might not even use ARQ if they have a low QoS requirement.

Another characteristic of the present invention is to switch off the MAC multiplexing to make incremental redundancy more efficient. This can be done in connection with the decision to use incremental redundancy or not. This will ensure that if incremental redundancy is used, different logical channels are passed as separate transport channels to the physical layer. In addition to the transport blocks for each transport channel, further information is given to the physical layer if incremental redundancy shall be used or not. Incremental redundancy is only possible for logical channels that apply ARQ (that are in acknowledged mode).

The particular transport channel which will use incremental redundancy, in the downlink, also will depend on the capabilities of the mobile terminal. The main limitation in the terminal will be lack of memory to store the soft-decision values. If the mobile terminal can not support incremental redundancy for all transport channels, incremental redundancy can be switched off for some transport channels.

What is claimed is:

1. A hybrid ARQ transmission method comprising:
transmitting a protocol data unit on a data channel;
assigning a sequence number for the protocol data unit; and
transmitting the sequence number on a control channel with an allocation message of the data channel,
wherein the quality of service (QoS) of the control channel is controlled based on adjustment of a transmission power of the control channel, independently from the QoS of the data channel.

2. The method according to claim 1, wherein the allocation message includes information indicating a transport format of the data channel.

3. The method according to claim 1, further comprising receiving a message on a successful or unsuccessful reception of a previous transmission.

4. The method according to claim 1, further comprising:
receiving a request for retransmission of the protocol data unit; and
retransmitting the protocol data unit.

5. A hybrid ARQ transmission method comprising:
transmitting a protocol data unit on a data channel;
assigning a sequence number for the protocol data unit; and
transmitting the sequence number on a control channel with an allocation message of the data channel,
wherein the quality of service (QoS) of the data channel is controlled based on adjustment of a coding rate of the data channel, independently from the QoS of the control channel.

6. A hybrid ARQ transmission method comprising:
transmitting a protocol data unit on a data channel;
assigning a sequence number for the protocol data unit; and
transmitting the sequence number on a control channel with an allocation message of the data channel,
wherein the quality of service (QoS) of the control channel is controlled independently from the QoS of the data channel.

7. A hybrid ARQ transmission method comprising:
transmitting a protocol data unit on a data channel;
assigning a sequence number for the protocol data unit; and
transmitting the sequence number on a control channel with an allocation message of the data channel,
wherein a transmission power of the control channel is set independently from a transmission power of the data channel.

8. A hybrid ARQ transmission method comprising:
transmitting a protocol data unit on a data channel;
assigning a sequence number for the protocol data unit; and
transmitting the sequence number on a control channel with an allocation message of the data channel,
wherein a coding rate of the data channel is set independently from a coding rate of the control channel.

9. A hybrid ARQ transmission method comprising:
transmitting a protocol data unit on a data channel;
assigning a sequence number for the protocol data unit; and
transmitting the sequence number on a control channel with an allocation message of the data channel,
wherein a spreading factor of the control channel is set independently from a spreading factor of the data channel.

10. A hybrid ARQ reception method comprising:
receiving a protocol data unit on a data channel; and
receiving a sequence number and an allocation message on a control channel, the sequence number being associated with the protocol data unit and the allocation message being of the data channel; and
decoding the protocol data unit;
wherein the quality of service (QoS) of the control channel is controlled based on adjustment of a transmission power of the control channel, independently from the QoS of the data channel.

11. The method according to claim 10, wherein the allocation message includes information indicating a transport format of the data channel.

12. The method according to claim 10, further comprising combining a retransmitted protocol data unit with a previously received protocol data unit based on the sequence number.

13. A hybrid ARQ reception method comprising:
receiving a protocol data unit on a data channel; and
receiving a sequence number and an allocation message on a control channel, the sequence number being associated with the protocol data unit and the allocation message being of the data channel; and
decoding the protocol data unit;
wherein the quality of service (QoS) of the data channel is controlled based on adjustment of a coding rate of the data channel, independently from the QoS of the control channel.

14. A hybrid ARQ reception method comprising:
receiving a protocol data unit on a data channel; and
receiving a sequence number and an allocation message on a control channel, the sequence number being associated with the protocol data unit and the allocation message being of the data channel; and
decoding the protocol data unit;
wherein the quality of service (QoS) of the control channel is controlled independently from the QoS of the data channel.

15. A hybrid ARQ reception method comprising:
receiving a protocol data unit on a data channel;
receiving a sequence number and an allocation message on a control channel, the sequence number being associated with the protocol data unit and the allocation message being of the data channel; and
decoding the protocol data unit;
wherein a transmission power of the control channel is set independently from a transmission power of the data channel.

16. A hybrid ARQ reception method comprising:
receiving a protocol data unit on a data channel; and
receiving a sequence number and an allocation message on a control channel, the sequence number being associated with the protocol data unit and the allocation message being of the data channel; and
decoding the protocol data unit;
wherein a coding rate of the data channel is set independently from a coding rate of the control channel.

17. A hybrid ARQ reception method comprising:
receiving a protocol data unit on a data channel;
receiving a sequence number and an allocation message on a control channel, the sequence number being associated with the protocol data unit and the allocation message being of the data channel; and
decoding the protocol data unit;
wherein a spreading factor of the control channel is set independently from a spreading factor of the data channel.

* * * * *